United States Patent [19]

Schulz

[11] 4,320,162

[45] Mar. 16, 1982

[54] MULTI-PLY FIBROUS SHEET STRUCTURE AND ITS MANUFACTURE

[75] Inventor: Galyn A. Schulz, Appleton, Wis.

[73] Assignee: American Can Company, Greenwich, Conn.

[21] Appl. No.: 149,913

[22] Filed: May 15, 1980

[51] Int. Cl.³ .................... B32B 3/28; B32B 29/00
[52] U.S. Cl. .................................. 428/154; 156/209; 156/210; 162/113; 162/117; 162/205; 428/156; 428/166; 428/172; 428/178; 428/184; 428/212; 428/332
[58] Field of Search .............. 428/154, 166, 178, 183, 428/184, 212, 156, 332, 172; 162/113, 117, 205; 156/204, 209, 582, 210

[56] References Cited

U.S. PATENT DOCUMENTS

| | | | |
|---|---|---|---|
| 2,854,336 | 9/1958 | Gutnecht | 96/36 |
| 3,708,366 | 1/1973 | Donnelly | 156/209 |
| 3,867,225 | 2/1975 | Nystrand | 156/209 |
| 3,868,205 | 2/1975 | Thomas | 156/555 |

*Primary Examiner*—Paul J. Thibodeau
*Attorney, Agent, or Firm*—Robert P. Auber; George P. Ziehmer; Harry W. Hargis, III

[57] ABSTRACT

In the manufacture of a multi-ply fibrous sheet structure, each of a pair of plies of fibrous web material is provided with a pattern of relatively deep, primary, spot embossments each adherent to the opposite ply and surrounded by a pattern of relatively shallow, secondary, non-adherent spot embossments.

18 Claims, 8 Drawing Figures

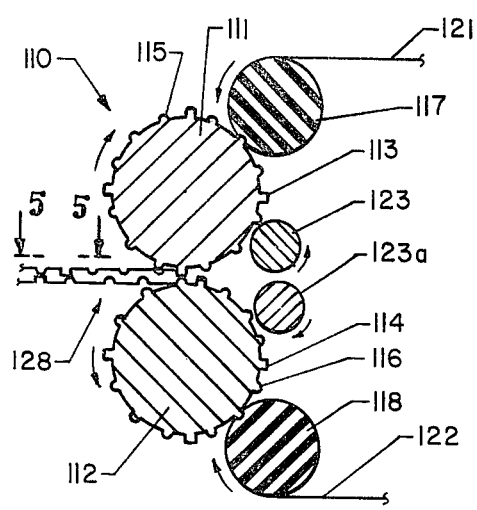
FIG.4
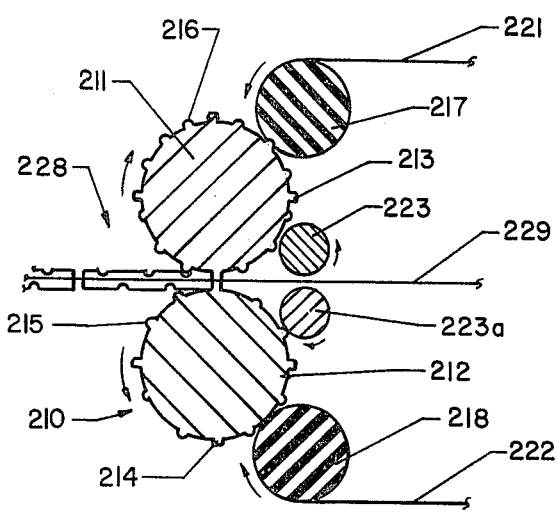
FIG.7
FIG.5
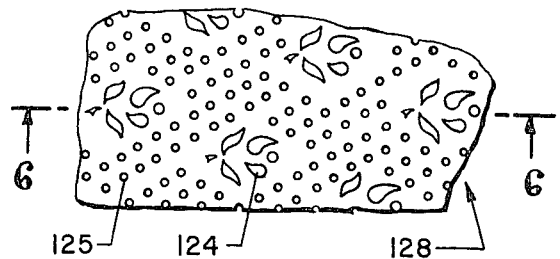
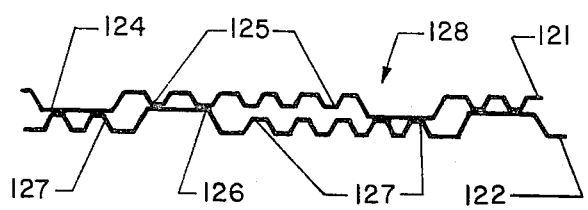
FIG.6
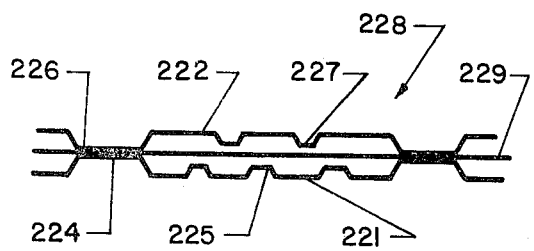
FIG.8

MULTI-PLY FIBROUS SHEET STRUCTURE AND ITS MANUFACTURE

BACKGROUND OF THE INVENTION

This invention relates to improvements in the manufacture of multi-ply fibrous sheet structure, particularly of the soft absorbent type such as, for example, paper towels.

In the manufacture of paper towels, efforts have been directed to improving important product qualities such as softness, water absorbency, and bulk. Softness, absorbency, and a degree of bulk have been imparted to multi-ply fibrous sheet structure by providing highly repetitive patterns of closely spaced embossments in confronting joined plies of fibrous web material, in combination with application to the joined plies of decorative, relatively widely spaced spot embossments. Such a structure is disclosed and claimed in my copending U.S. Patent Application Ser. No. 149,912, filed May 15, 1980, a continuation of the application entitled "Multi-Ply Fibrous Sheet Structure and Its Manufacture", Ser. No. 21,915, filed Mar. 19, 1979, now abandoned, and both assigned to the assignee of the present invention.

The following U.S. Patents also are representative of the prior art, and are believed material to the examination of the present invention.

U.S. Pat. No. 2,854,336, in FIG. 19 thereof, discloses an embossing roll 24 having primary and secondary design protuberances 25 and 26, respectively.

U.S. Pat. No. 3,867,225 discloses a two-ply web T (FIGS. 3 and 4) wherein embossments 25 of one ply 29 are of lesser depth than embossments 17 of the other ply 30. Embossments 17 are adherent to ply 29 to hold plies 29 and 30 together.

U.S. Pat. No. 3,868,205, in FIG. 16 thereof, discloses a two-ply web wherein each of the webs have relatively deep embossments within which are formed relatively shallow, adherent embossments.

U.S. Pat. No. 3,708,366, in FIG. 2 thereof, discloses a pair of webs 6 and 7 adherent in the regions of relatively deep embossments in web 6, and non-adherent in the regions of relatively shallow embossments in web 7.

The hereinabove described U.S. Patents have in common the concept of "double-depth" embossing to produce increased bulk in a two-ply web.

It is an objective of my invention to provide an improved multi-ply fibrous sheet structure embodying a novel and useful arrangement of double-depth embossments.

It is a further objective of my invention to provide an improved multi-ply household tissue structure embodying an arrangement of double-depth embossments that enhance its softness, water retention, bulk, and aesthetics.

SUMMARY OF THE INVENTION

In achievement of the foregoing as well as other general objectives, the invention contemplates fabrication of a multi-ply fibrous sheet structure comprising the provision, on each of a pair of plies of fibrous web material, of a pattern of first, relatively deep embossments joined at distal portions thereof to the opposite ply, and a pattern of second, relatively shallow, non-joined embossments surrounding embossments of said first pattern.

The manner in which objectives of the invention may best be achieved will be more fully understood from the following description, taken in light of the accompanying drawing.

BRIEF DESCRIPTION OF THE DRAWING

FIG. 4 is a view similar to FIG. 1, and illustrating another apparatus for manufacturing a modified form of embossed multi-ply fibrous web structure also contemplated by the invention;

FIG. 5 is a fragmented plan view of the modified embossed web structure, looking in the direction of arrows 5—5 in FIG. 4;

FIG. 6 is a somewhat diagrammatic sectional showing, on an enlarged scale, taken generally along the line 6—6 in FIG. 5; and FIGS. 7 and 8 are similar to FIGS. 4 and 6 respectively, and illustrate further embodiments of the invention.

DESCRIPTION OF THE SEVERAL EMBODIMENTS OF THE INVENTION

Figure 1:
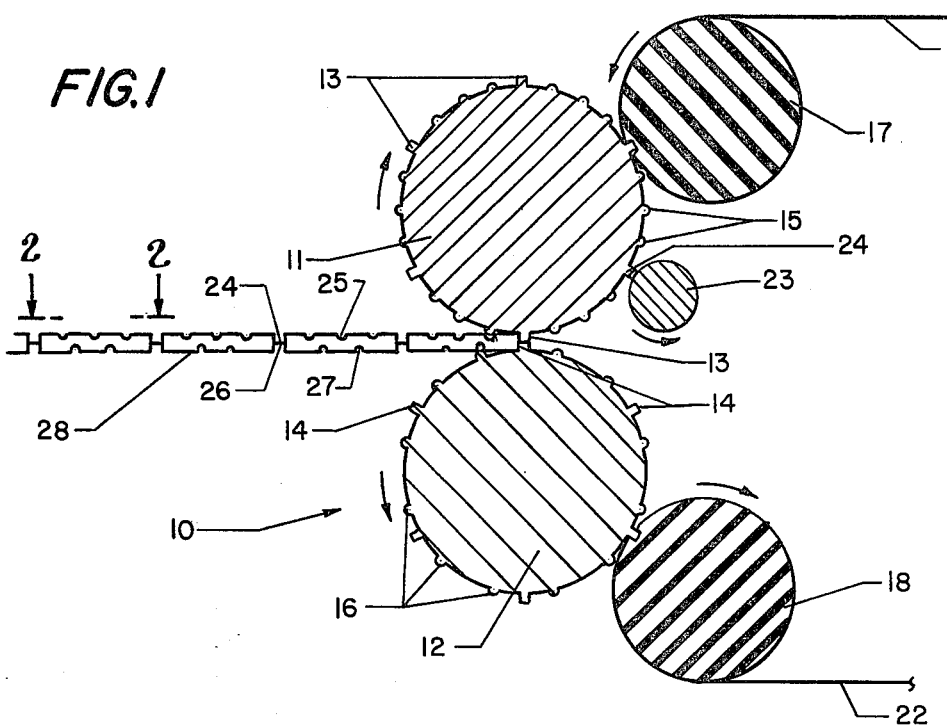
FIG. 1 is a diagrammatic elevational view of an apparatus for manufacturing one form of embossed multi-ply fibrous web structure contemplated by the invention.

With more detailed reference to the drawing, and first to FIG. 1, an apparatus 10 includes a pair of embossing rolls 11 and 12 made of substantially rigid material, such as steel, provided with aligned patterns of identical protuberances 13 and 14, respectively, of relatively greater radial extent, and meshed patterns of identical protuberances 15 and 16, respectively, of relatively lesser radial extent to be described in detail in what follows. Rolls 11 and 12 are of like diameter, are mounted for rotation about parallel axes by suitable drive means of known construction, and are so cooperably disposed as to form a ply bonding nip between aligned protuberances 13 and 14.

A pair of embossing backup rolls 17 and 18 made of flexible and resilient material, such as rubber, are mounted for rotation about parallel axes by known suitable drive means, and are so cooperably disposed as respects steel rolls 11 and 12, respectively, as to form embossing nips therewith.

Figure 2:
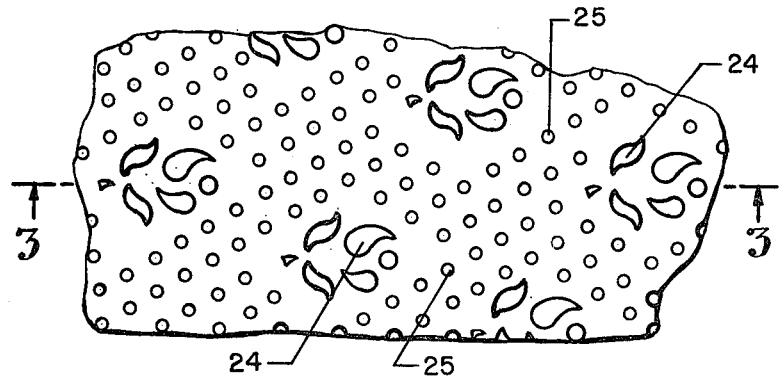
FIG. 2 is a fragmented plan view of the embossed web structure, looking in the direction of arrows 2—2 in FIG. 1.

A pair of plies in the form of webs 21 and 22, for example, creped coarse fiber stock such as is used in toweling, having a basis weight of from about 10 lbs. per ream (3,000 sq. ft.) to about 20 lbs. per ream, are fed from suitably arranged supply means (not shown) over rubber backup rolls 17 and 18, respectively. Web 21 is then fed between rolls 11 and 17, while web 22 is fed between rolls 12 and 18, and, as is seen from the showings of FIGS. 1, 2, and 3, there are formed in each web the relatively deep embossments 24, 26 comprising land and recess areas and the relatively shallow surrounding embossments 25, 27 comprising land and recess areas, corresponding to the pattern of protuberances 13, 14 and 15, 16 on rolls 11 and 12, respectively. Adhesive applicator means of conventional construction includes an applicator roll 23 positioned to apply adhesive to the relatively deep embossments 24, but not to the relatively shallow embossments 25, on web 21.

It will be understood that the embossments 24, 25 and 26, 27 thus far described are formed by simultaneous rotations of the several rolls 11, 17 and 12, 18 according to the applied directional arrows. Applicator roll 23 applies adhesive to the distal portions of land areas of embossments 24 on web 21 of one ply, so that when the latter are brought into the nip of rolls 11 and 12, defined by aligned or confronting protuberances 13 and 14, they are joined or adhered to confronting land areas of embossments 26 on web 22 of the opposite ply, embossments 25 and 27 being non-adhered, in formation of sheet structure 28 of improved softness, water retention, bulk, and aesthetics.

Figure 3:
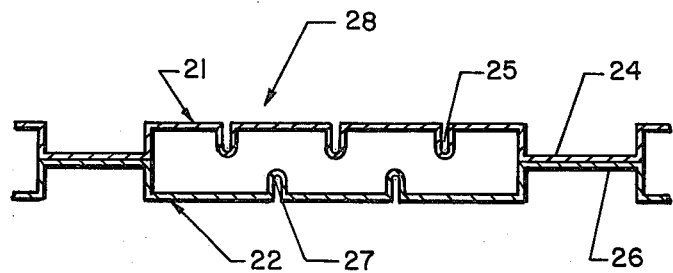
FIG. 3 is a somewhat diagrammatic sectional view, on an enlarged scale, taken generally along the line 3—3 in FIG. 2.

As will be understood from FIG. 3, relativlely widely spaced larger, aligned embossments 24, 26 are from about 0.040 inch to about 0.090 inch deep and relatively closely spaced smaller embossments 25, 27 are from about 0.015 inch to about 0.050 inch deep. Since distal portions of land area of widely spaced, deeper embossments 24, 26 are aligned and adherent, the depth of these embossments is somewhat additive, contributing to increased bulk.

The relatively wide spacing of embossments 24, 26, taken with inherent flexibility of webs 21 and 22, permits distal portions of the meshed land areas of embossments 25, 27 of lesser depth to abuttingly engage confronting inner surfaces of the opposite webs and contribute to the softness of the web structure 28.

Considering apparatus for manufacturing a modified form of embossed fibrous web structure, and with reference to FIG. 4, such an apparatus 110 includes a pair of embossing rolls 111 and 112 provided with meshed patterns of identical protuberances 113 and 114, respectively, of relatively greater radial extent and intervening patterns of identical protuberances 115 and 116, respectively, of relatively lesser radial extent. Rolls 111 and 112 are of like diameters and are mounted for rotation to form a ply bonding nip alternatively between protuberances 113, 116 and between protuberances 114, 115. A pair of embossing backup rolls 117 and 118 are cooperably disposed as respects rolls 111 and 112 to form embossing nips therewith.

A pair of plies in the form of webs 121 and 122 of the type hereinabove described are fed between rolls 117 and 111, and between rolls 118 and 112, respectively. As is seen in FIG. 6, there are formed in each web the relatively deep embossments 124, 126 and the relatively shallow embossments 125, 127 corresponding to the pattern of protuberances 113, 115 and 114, 116 on rolls 111 and 112, respectively. Embossments 124 and 125, only, are seen in FIG. 5. Adhesive applicator means of known construction includes a pair of applicator rolls 123, 123a positioned to apply adhesive to the relatively deep embossments 124, 126, respectively, (FIG. 6) but not to the shallow embossments 125, 127.

Embossments 124, 125 and 126, 127 are formed by simultaneous rotations of the several rolls according to the applied directional arrows. Applicator rolls 123, 123a apply adhesive to distal portions of embossments 124, 126, respectively, so that when the latter are brought into the bonding nip of rolls 111 and 112, they are joined or adhered, in formation of a sheet, to confronting embossments 127, 125, respectively, on the opposite one of webs 121 and 122 comprising the plies. Certain of embossments 125, 127 are non-adhered in formation of web structure 128 of improved softness, water retention, bulk and aesthetics.

As in the hereinabove described other embodiment, the deeper embossments 124, 126 are from about 0.040 inch to about 0.090 inch deep, and the shallower embossments are from about 0.015 inch to about 0.050 inch deep.

One of adhesive applicator rolls 123 and 123a may be deleted from the apparatus shown in FIG. 4, so that only the remaining one of rolls 123 and 123a will apply adhesive for adhering webs 121 and 122 together in the finished 2-ply sheet structure 128. The resulting sheet may thus advantageously have less adhesive, and fewer embossments adhered to the opposing ones of webs 121 and 122 in achievement of a still softer, and more drapable, sheet.

Apparatus for manufacturing still another form of embossed fibrous sheet structure in accordance with the invention, and with reference to FIG. 7, is seen at 210. The apparatus includes a pair of embossing rolls 211 and 212, similar to those seen in FIG. 1, and provided with aligned patterns of identical protuberances 213 and 214 of relatively greater radial extent and non-aligned or meshed patterns of identical protuberances 215 and 216, respectively of relatively less radial extent. Rolls 211 and 212 are so cooperably disposed as to form a ply bonding nip between protuberances 213 and 214.

A pair of embossing backup rolls 217 and 218 are so cooperably disposed as respects rolls 211 and 212, respectively, as to form embossing nips therewith.

A pair plies in the form of of webs 221 and 222 of the usual stock are fed between the nips of rolls 211, 217 and of rolls 212, 218, respectively. Adhesive applicator rolls 223 and 223a are positioned and adapted to apply adhesive to the relatively deep embossments 224 and 226 (FIG. 8) prior to entry of webs 221 and 222 into the bonding nip. A third, intermediate ply comprising a web 229 of highly creped coarse fiber paper stock is fed from a suitable supply into the bonding nip of webs 221 and 222.

Simultaneous rotation of rolls 221, 217 and 212, 218, according to the applied directional arrows, forms embossments 224, 225 and 226, 227, while applicator rolls 223 and 223a rotate to apply adhesive to the distal portions of embossments 224 and 226, respectively. With the adhesive applied in this manner, when embossments 224 and 226 are brought into the nip of rolls 221 and 212, as defined by protuberances 213 and 214, they are adhered to the intermediate third ply 229. Thus, as is seen in the inverted section shown in FIG. 8, the deeper embossments are joined by the intervening or center ply.

The apparatus of FIG. 7 may be adjusted to provide meshed patterns of protuberances on rolls 221 and 212, similar to the meshed patterns illustrated in FIG. 4. The finished 3-ply product corresponding to 228 of FIG. 7 will have a meshed pattern as in FIG. 6 with the interposed third ply as in FIG. 8.

In any of the embodiments of the fibrous sheet structure, the novel arrangements of double-depth embossments enhance the softness, water retention, bulk and aesthetics of the structure. The structure is economically achieved by both an improved apparatus and an improved method.

While the invention has been described with reference to several embodiments thereof, it will be apparent to those skilled in the art that modifications can be made without departing from the scope of the appended claims.

I claim:

1. Multi-ply fibrous sheet structure, comprising: a pair of fibrous webs forming the plies with inner surfaces facing each other, each web having a first pattern of embossments of a first uniform depth comprising land and recess areas on said inner surfaces of said web, and a second pattern of embossments surrounding said first pattern, being of a second uniform depth less than the first, comprising land and recess areas on said inner surfaces of said webs; adhesive means joining distal portions of said land areas of said first pattern on one of said webs to the facing, other one of said webs; and distal portions of said land areas of said second pattern of embossments that surround said land areas of said second pattern of embossments on each of said webs being non-joined to the facing web.

2. The sheet structure of claim 1, wherein said embossments of said first pattern are identical and are uniformly spaced from one another, and said embossments of said second pattern are identical, and are uniformly spaced one from the other in regions of said webs between said embossments of said first pattern.

3. The sheet structure of claim 1, wherein said embossments of said first pattern of one of said webs are aligned with like embossments of the other of said webs, and said embossments of said second pattern of one of said webs are disposed in meshed array as respects like embossments of the other of said webs.

4. The sheet structure of claim 3, wherein said means for joining said distal portions of said embossments of said first pattern comprises an intermediate ply of fibrous web material adhered to said distal portions.

5. The sheet structure of claim 1 or 2, wherein said fibrous webs comprise creped coarse fiber stock having a basis weight of from about 10 lbs. per ream to about 20 lbs. per ream, said first depth is from about 0.040 inch to about 0.090 inch, and said second depth is from about 0.015 inch to about 0.050 inch.

6. The sheet structure of claim 3, wherein said fibrous webs comprise creped coarse fiber stock having a basis weight of from about 10 lbs. per ream to about 20 lbs. per ream, said first depth is from about 0.040 inch to about 0.090 inch, and said second depth is from about 0.015 inch to about 0.050 inch.

7. The sheet structure of claim 1, wherein said fibrous webs comprise creped coarse fiber stock having a basis weight of from about 10 lbs. per ream to about 20 lbs. per ream, said first depth is from about 0.040 inch to about 0.090 inch, and said second depth is from about 0.015 inch to about 0.050 inch.

8. The sheet structure of claim 1, wherein said fibrous webs comprise creped coarse fiber stock having a basis weight of from about 10 lbs. per ream to about 20 lbs. per ream, said first depth is from about 0.040 inch to about 0.090 inch, and said second depth is from about 0.015 inch to about 0.050 inch.

9. The sheet structure of claim 4, wherein said fibrous webs comprise creped coarse fiber stock having a basis weight of from about 10 lbs. per ream to about 20 lbs. per ream, said first depth is from about 0.040 inch to about 0.090 inch, and said second depth is from about 0.015 inch to about 0.050 inch.

10. A method for fabricating a multi-ply fibrous sheet structure, comprising: embossing each of a pair of fibrous webs with a first pattern of embossments of a first uniform depth comprising land and recess areas on a surface of each said web; embossing each of said pair of webs with a second pattern of embossments surrounding said first pattern, being of a second uniform depth less than the first, and comprising land and recess areas on said surface of each said web; disposing said webs with said surfaces acing each other; and adhesively joining only distal portions of said land areas of said first pattern of embossments on one of said webs to the other of said webs to form said sheet structure.

11. The method of claim 10, wherein said patterns are embossed simultaneously.

12. The method of claim 10 or 1, wherein said first embossments extend to a depth of from about 0.040 inch to about 0.090 inch, said second embossments extend to a depth of from about 0.015 inch to about 0.050 inch, and said webs comprise creped coarse fiber stock having a basis weight of from about 10 lbs. per ream to about 20 lbs. per ream.

13. Multi-ply fibrous sheet structure, comprising: a pair of fibrous webs forming the plies with inner surfaces facing each other, each web having a first pattern of embossments of a first uniform depth comprising land and recess areas on said inner surfaces of said web, and a second pattern of embossments surrounding said first pattern, being of a second uniform depth less than the first, and comprising land and recess areas on said inner surfaces of said webs; adhesive means joining distal portions of said land areas of said first pattern on one of said webs to the distal portions of said land areas of said pattern on the facing, other one of said webs; and distal portions of said land areas of said second pattern of embossments on each of said webs that surround said land areas of said first pattern of embossments being non-joined to the facing web.

14. The sheet structure of claim 13, wherein said embossments of said first pattern are identical and are uniformly spaced one from the other, and said embossments of said second pattern are identical and are uniformly spaced one from the other in regions of said webs between said embossments of said first pattern.

15. The sheet structure of claim 13 or 14, wherein said fibrous webs comprise creped coarse fiber stock having a basis weight of from about 10 lbs. per ream to about 20 lbs. per ream, said first depth is from about 0.040 inch to about 0.090 inch, and said second depth is from about 0.015 inch to about 0.050 inch.

16. A method for fabricating a multi-ply fibrous sheet structure, comprising: embossing each of a pair of fibrous webs with a first pattern of embossments of a first uniform depth comprising land and recess areas on a surface of each said web; embossing each of said pair of webs with a second pattern of embossments surrounding said first pattern, being of a second uniform depth less than the first, and comprising land and recess areas on said surface of each said web; disposing said webs with said surfaces facing each other so that land areas of said first pattern of embossments confront one another and land areas of said second pattern of embossments are meshed with one another; and adhesively joining only distal portions of said land areas of said first pattern of embossments on one of said webs to the distal portions of the corresponding land areas on the other of said webs to form said sheet structure.

17. The method of claim 16, wherein said patterns are embossed simultaneously.

18. The method of claim 16 or 17, wherein said first embossments extend to a depth of from about 0.040 inch to about 0.090 inch, and said second embossments extend to a depth of from about 0.015 inch to about 0.050 inch.

* * * * *